United States Patent Office 3,198,510
Patented Aug. 3, 1965

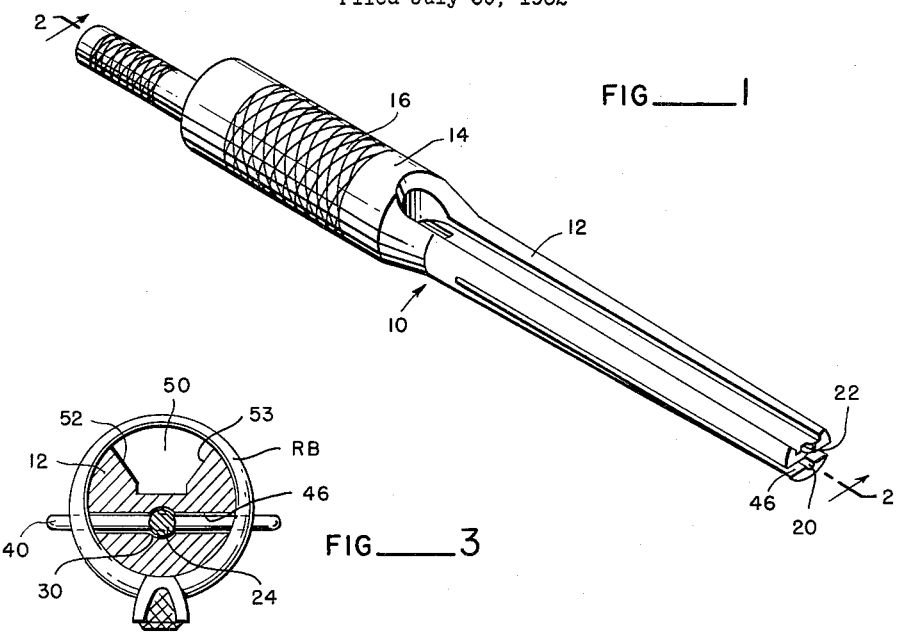
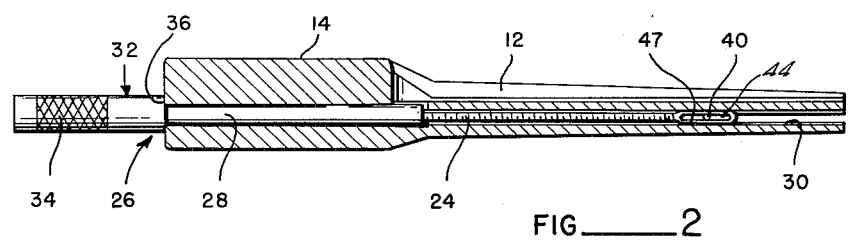
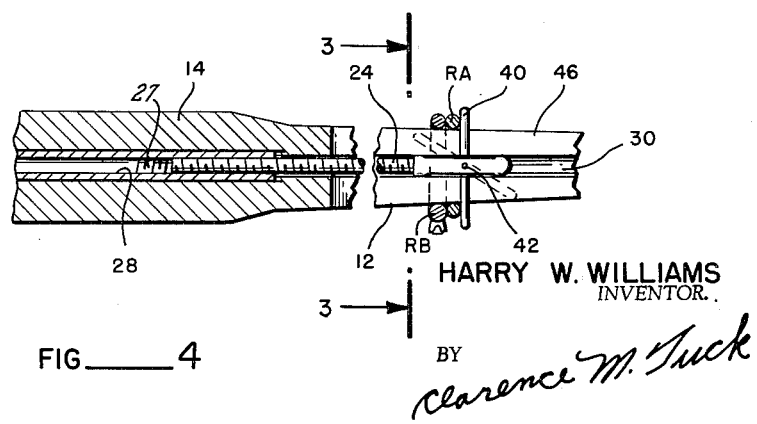

3,198,510
RING WELDING FIXTURE
Harry W. Williams, P.O. Box 718, Centralia, Wash.
Filed July 30, 1962, Ser. No. 213,441
3 Claims. (Cl. 269—52)

This present invention relates to the general class of tools and devices used in the manufacture and repair of jewelry. More especially, this invention relates to a device on which a ring may be positioned at a point indicating its inside diameter and be securely held there during the welding, soldering or other operations required in the repair, manufacture or joining of rings. This device further is of particular value in holding two rings together so that they can be welded together as a pair as is quite frequently done with a wedding ring and an engagement ring.

A principal object of my present invention therefore is to provide a tapered mandrel on which may be graduated the interior rings sizes of the usual finger rings. This mandrel is especially provided with means for holding one or more usually two rings in exact position while a weld or braze is being made to join them together.

A further object of this invention is to provide a tapered mandrel having a configured handle to facilitate convienent and exact handling of the tool.

A further object of this invention is to provide a longitudinal bore through the mandrel and handle and to then split the tapered portion of the mandrel on a diameter so as to provide two equal and oppositely positioned slots extending substantially its length.

A further object of this invention is to provide a ring engaging member which will engage a ring on opposite ends of the diameter and permit the application of considerable pressure, thus tending to move the rings up on the larger portion of the tapered mandrel so as to insure a secure positioning and holding thereof.

A further object of this invention is to provide a longitudinally disposed valley having outwardly tapering sides so that substantially one fourth or one fifth of the periphery of the mandrel is cut away to provide access for working on the inner surfaces of rings.

Further objects, advantages and capabilities will be apparent from the disclosure in the drawings or may be comprehended or are inherent in the device.

nI the drawings:

FIGURE 1 is a prespective view showing one embodiment of my invention in reduced size.

FIGURE 2 is a longitudinal sectional view taken along the line 2—2 of FIGURE 1.

FIGURE 3 is a cross-sectional view, on a substantially increased scale, taken along the line 3—3 of FIGURE 4.

FIGURE 4 is a longitudinal sectional view showing substantially a portion of FIGURE 2 and showing in greater detail the structure by which the ring engaging member is moved longitudinally of the mandrel and showing also an engagement and a wedding ring in position for welding them together.

Referring to the drawings, throughout which like reference numerals indicate like parts, the numeral 10 designates generally a preferred embodiment of my present invention. This unit consists of a tapered mandrel portion 12 which may be likened to the usual ring sizing gauge employed in jewelery stores, and in this instance the mandrel may be graduated with the same scales if this is desirable. Formed as part of mandrel 12 is the handle 14 which is preferably on a substantially increased diameter so as to provide a good firm grip surface to the end that rings and other work can be held rigidly in position as desired. The hand grip portion is preferably knurled or otherwise configured as indicated at 16 to increase the firmness of the handle gripping operation.

A two diameter bore is provided throughout the length of mandrel body 10 and axially therewith. The smaller diameter bore portion is indicated in FIGURE 1 by the two arcuate portions 20 and 22 forming a bore large enough to freely accept the threaded end of thrust rod 24 which is part of the ring tightening rod assembly 26. The rod assembly, which includes the threaded portion 24, has an interiorly threaded member 28 with interior threads 27 of a size to coact with the threaded rod 24, which rod freely moves within the bore indicated by the acruate portions 20 and 22. Formed preferably as part of the interiorly threaded member 28, which revolves within the larger bore 30, is the handle 32 which in turn is knurled or otherwise configured at 34 to increase the ease of gripping the same for rotary motion. The end face 36 of handle 32, which abuts the handle or hand grip 14, is the reaction surface countering the thrust of toggle pin 40 when it is pressed against a ring by screw 24.

Engaging means are further provided adjacent the free end of screw 24 for the application of pressure to the side of the ring or rings which face the smaller diameter end of the tapered portion 12 of mandrel 10. Throughout the figures, as representative of one form of such a structure, is the toggle pin 40. This pin is pivoted at 42 to the free end of threaded screw 24 and is given a restricted range of movement by means of the slot 44 which can be observed in FIGURE 2.

Portion 12 of mandrel 10 is slotted to provide bifurcation, as indicated at 46, as a path for a ring engaging member such as toggle 40 so that it may engage the outside of the ring RA disposed toward the small diameter end of mandrel 10.

Referring to FIGURE 3 it will be observed that in addition to the bifurcating cut 46, portion 12 is provided with a valley at 50 which may be machined into one side of the ring engaging member and is preferably provided with flaring sides as 52 and 53. This arrangement assures that an adequate working space will be provided underneath the rings thus permitting welding on the inner surface of the rings which is normally out of sight when the rings are being worn.

It is believed that it will be clearly apparent from the above description and the disclosure in the drawings that the invention comprehends a novel construction of ring welding fixture.

Having thus described my invention, I claim:

1. A ring welding fixture, comprising: (a) an elongated fixture body including a generally cylindrical hand grip means at the rear portion thereof and a longer mandrel portion extending from said hand grip and forming the remainder of said body, said mandrel portion tapering from said hand grip to the end thereof, (b) a first bore means extending longitudinally through said hand grip means and a second smaller diameter bore means extending longitudinally from said first bore means completely through said mandrel portion to define a passageway entirely through said body, (c) an elongated bifurcating cut extending from the outer end and along substantially the entire length of said mandrel portion, said cut joining with said second bore to separate said mandrel into upper and lower sections, (d) a handle element located coaxially with said bores at the hand grip end of said body and having an interiorly threaded member rotatably received in said first bore, and (e) an elongated threaded rod means threadably received in said member and extending into said mandrel portion through said second bore, said rod means having toggle pin means pivotally attached to the end of said rod extending transversely to said rod through and out of said cut.

2. A ring welding fixture, comprising: (a) an elongated fixture body including a generally cylindrical hand grip means at the rear portion thereof and a longer mandrel portion extending from said hand grip and forming the remainder of said body, said mandrel portion tapering from said hand grip to the end thereof, (b) a first bore means extending longitudinally through said hand grip means and a second smaller diameter bore means coaxially aligned with and extending longitudinally from said first bore means completely through said mandrel portion to define a passageway entirely through said body, (c) an elongated bifurcating cut extending from the outer end and along substantially the entire length of said mandrel portion, said cut joining with said second bore to separate said mandrel into upper and lower sections, (d) a handle element located coaxially with said bores at the hand grip end of said body and having an interiorly threaded member rotatably received in said first bore, and (e) an elongated threaded rod means threadably received in said member and extending into said mandrel portion through said second bore, said rod means having toggle pin means pivotally attached to the end of said rod, said toggle pin means being mounted on said rod so as to extend to each side of its pivotal mounting, through said cut and to protrude on each side beyond said mandrel portion.

3. A ring welding fixture, comprising: (a) an elongated fixture body including a generally cylindrical hand grip means at the rear portion thereof and a longer mandrel portion extending from said hand grip and forming the remainder of said body, said mandrel portion tapering from said hand grip to the end thereof, (b) a first bore means extending longitudinally through said hand grip means and a second smaller diameter bore means coaxially aligned with and extending longitudinally from said first bore means completely through said mandrel portion to define a passageway entirely through said body, (c) an elongated bifurcated cut extending from the outer end and along substantially the entire length of said mandrel portion, said cut joining with said second bore to separate said mandrel into upper and lower sections, (d) a handle element located coaxially with said bores at the hand grip end of said body and having an interiorly threaded member rotatably received in said first bore, (e) an elongated threaded rod means threadably received in said member and extending into said mandrel portion through said second bore, said rod means having toggle pin means pivotally attached to the end of said rod and extending transversely to said rod through and out of said cut, and (f) a valley means formed on the upper side of said upper mandrel section to permit access to the inside of rings being held on said mandrel by said toggle pin means.

References Cited by the Examiner

UNITED STATES PATENTS

| | | | |
|---|---|---|---|
| 1,583,967 | 5/26 | Epps | 279—39 XR |
| 1,655,813 | 1/28 | Helfgott | 29—263 XR |
| 2,102,546 | 12/37 | Schatz | 113—111 XR |
| 2,618,053 | 11/52 | Claps | 29—263 |
| 2,679,091 | 5/54 | Stratton | 29—256 |
| 2,803,210 | 8/57 | Lohman | 113—111 |

CHARLES W. LANHAM, *Primary Examiner.*

JOHN F. CAMPBELL, *Examiner.*